United States Patent
Takizawa et al.

(10) Patent No.: US 9,516,481 B2
(45) Date of Patent: Dec. 6, 2016

(54) SYSTEM FOR USING COMMUNICATION TERMINAL

(75) Inventors: Ryo Takizawa, Edogawa-ku (JP); Ko Koga, Setagaya-ku (JP); Yoshiyuki Oya, Mitaka (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 216 days.

(21) Appl. No.: 13/884,661

(22) PCT Filed: Nov. 11, 2010

(86) PCT No.: PCT/JP2010/070123
§ 371 (c)(1),
(2), (4) Date: Jul. 11, 2013

(87) PCT Pub. No.: WO2012/063346
PCT Pub. Date: May 18, 2012

(65) Prior Publication Data
US 2013/0281067 A1    Oct. 24, 2013

(51) Int. Cl.
*H04W 4/16* (2009.01)
*H04M 1/725* (2006.01)

(52) U.S. Cl.
CPC ............ *H04W 4/16* (2013.01); *H04M 1/7253* (2013.01)

(58) Field of Classification Search
CPC . H04M 1/7253; H04M 1/72533; H04W 12/06
USPC .................... 455/414.1; 340/10.51
See application file for complete search history.

(56) References Cited

U.S. PATENT DOCUMENTS

| 7,359,696 B2* | 4/2008 | Tanaka | H04M 1/72533 340/10.1 |
| 7,869,392 B2* | 1/2011 | Sabo | G08B 25/008 370/328 |
| 2008/0309451 A1 | 12/2008 | Zellweger et al. | |

FOREIGN PATENT DOCUMENTS

| CN | 101341517 A | 1/2009 |
| JP | 2002-230641 A | 8/2002 |
| JP | 2004-106800 A | 4/2004 |
| JP | 2005-339196 A | 12/2005 |
| JP | 2006-079489 A | 3/2006 |
| JP | 2007-183749 A | 7/2007 |
| JP | 2009-096617 A | 5/2009 |
| JP | 2010-015415 A | 1/2010 |

* cited by examiner

Primary Examiner — Nizar Sivji
(74) Attorney, Agent, or Firm — Andrews Kurth Kenyon LLP (57) ABSTRACT

The system for using a communication terminal has a portable telephone user having a portable telephone, and a vehicle-mounted system is provided in a shared vehicle. In the portable telephone, an NFC is provided, and the vehicle-mounted system in the shared vehicle, an R/W for NFC communication is provided. When communication is performed for a first communication time between the R/W for NFC communication and the NFC by holding up the portable telephone to the R/W for NFC communication provided in the shared vehicle, door locking is performed. In addition, when communication is performed for a second communication time, a usage finishing process is performed.

1 Claim, 10 Drawing Sheets

SYSTEM FOR USING COMMUNICATION TERMINAL

This is a 371 national phase application of PCT/JP2010/070123 filed 11 Nov. 2010, the contents of which are incorporated herein by reference.

TECHNICAL FIELD

The present invention relates to a system for using a communication terminal which uses a communication terminal, and particularly to a system for using a communication terminal when a communication terminal is used in a vehicle or the like.

BACKGROUND ART

In recent years, systems for using communication terminals which require a communication terminal be provided with user identification information have been used. In addition, systems for using communication terminals are provided with operation devices which perform operations with respect to targets such as vehicles according to read and written identification information of a user which the communication terminal records. Through the communication terminal and operation device, target operations according to the user identification information become possible.

As this type of system for using a communication terminal, the target object is set as an elevator and an elevator operation mode management device which manages the operation mode of the elevator is disclosed in the related art (for example, refer to Patent Literature 1). In the elevator operation mode management device, an ordinary operation mode in which ordinary operation is performed and a special operation mode in which operations other than ordinary operation are performed are set for the elevator.

In addition, an input portion that inputs the user identification information is provided, an input count by the input portion is calculated, and setting the mode to the ordinary operation mode or the special operation mode is determined according to the calculated count. In a case where the elevator operation mode management device is used, a plurality of operations are able to be performed with a single item of identification information.

CITATION LIST

Patent Literature

[Patent Literature 1] Japanese Unexamined Patent Application Publication No. 2009-96617

SUMMARY OF INVENTION

Technical Problem

However, in the elevator operation mode management device disclosed in Patent Literature 1, when the ordinary operation mode or the special operation mode is determined, there is a need to set the input count to a different count. Thereby, in a case in which the elevator is to be operated by operating according to whichever mode, it is requested that the identification information be input a plurality of times. Thereby, if input of the identification information is forced upon the user a plurality of times, there is a problem in that the time and effort inflicted on the user increases.

Thereby, an object of the invention is to provide a system for using a communication terminal which is able to reduce the time and effort inflicted on the user along with being able to perform a plurality of operations according to a single item of identification information.

Solution to Problem

A system for using a communication terminal according to an aspect of the invention for solving the above problem includes a communication terminal provided with identification information storage means for storing user identification information, and an operation device that performs a predetermined operation according to the user identification information, in which the operation device has reading means for reading the identification information stored in the identification information storage means, instruction content determination means for determining the instruction content of the operation instructing a target based on the identification information read by the reading means and reading conditions when reading the identification information by the reading means, and operation instruction means for instructing the target to perform the operation according to the determined results of the instruction content determination means.

According to the system for using a communication terminal according of the aspect of the invention, instruction content of the operation instructing the target is determined based on the identification information read by the reading means and the reading conditions when reading the identification information by the reading means. Thereby, in cases where the reading conditions differ, differing instruction content is able to be set. Accordingly, it is possible to reduce the time and effort imposed on the user along with being able to perform a plurality of operations according to a single item of identification information.

Here, the reading conditions may be a state under which communication between the reading means and the communication terminal is maintained as it is.

In this way, by the reading conditions being conditions in which a state under which communication between the reading means and the communication terminal is maintained as it is, because the reading conditions are satisfied, there is no need to interrupt communication between the reading means and the communication terminal. Accordingly, it is possible to further reduce the time and effort imposed on the user along with being able to perform a plurality of operations according to a single item of identification information.

In addition, the reading conditions may be the length of the communication time between the reading means and the communication terminal.

In this way, the reading conditions may be easily distinguished by the reading conditions being the length of the communication time. Moreover, in "reading conditions" in the aspect of the invention, for example, the angle of opposition between the communication terminal and the reading means when reading of the identification information is performed, operation of the communication terminal, for example, a rocking operation and a swinging operation, and furthermore, a rotating operation and an operation changing direction are possible in addition to the length of the communication time.

In addition, the instruction content determination means may be able to determine between instruction content that corresponds to a predetermined first communication time and instruction content that corresponds to a second communication time longer than the first communication time.

In this way, it is possible to easily determine between two items of instruction content by enabling determining of instruction content that corresponds to a predetermined first communication time and instruction content which corresponds to a second communication time longer than the first communication time.

In addition, the operation instruction means may be unable to instruct an operation corresponding to the second communication time until instruction of the operation corresponding to the first communication time is performed, and may be able to instruct the operation corresponding to the second communication time after the instruction of the operation corresponding to the first communication time is performed.

In this way, since the operation corresponding to the second communication time may be instructed after the instruction of the operation corresponding to the first communication time is performed, there is no instruction corresponding to the second communication time performed without performing instruction corresponding to the first communication time. Accordingly, for example, in a case where instruction corresponding to the second communication time is necessary after the instruction corresponding to the first communication time, errors in which only the instruction corresponding to the second communication time is performed may be prevented.

Furthermore, the instruction content determination means may determine a basic operation as the operation corresponding to the first communication time and may determine a special operation as the operation corresponding to the second communication time.

In this way, by determining the operation corresponding to the first communication time as the basic operation and determining the operation corresponding to the second communication time as the special operation, it is possible to minimize misoperations when performing a special operation.

In addition, the target may be a shared vehicle, and the reading means may be provided in the shared vehicle.

In this way, since the target is a shared vehicle and the reading means is provided in the shared vehicle, the shared vehicle may be suitably used in so-called car sharing in which the shared vehicle is usable by a plurality of users.

Furthermore, the basic operation may be a door locking operation of the shared vehicle, and the special operation may be a usage starting and stopping procedure operation of the shared vehicle.

In this way, since the basic operation is a door locking operation of a shared vehicle and the special operation is a usage starting and stopping procedure operation of a shared vehicle, a situation in which use of the shared vehicle is stopped before the door locking operation is performed may be prevented. Thereby, a situation in which the return procedure of the shared vehicle is performed erroneously without performing door locking may be prevented.

Advantageous Effects of Invention

According to the system for using a communication terminal according to the aspect of the invention, it is possible to reduce the time and effort imposed on a user along with being able to perform a plurality of operations according to a single item of identification information.

DESCRIPTION OF EMBODIMENTS

Below, embodiments of the invention will be described with reference to the attached drawings. Moreover, in the description of the drawings, like references are applied to like elements and overlapping description will not be repeated. In addition, as a matter of convenience for depiction, dimensions and ratios in the drawings do not necessarily match those of the description.

Figure 1:
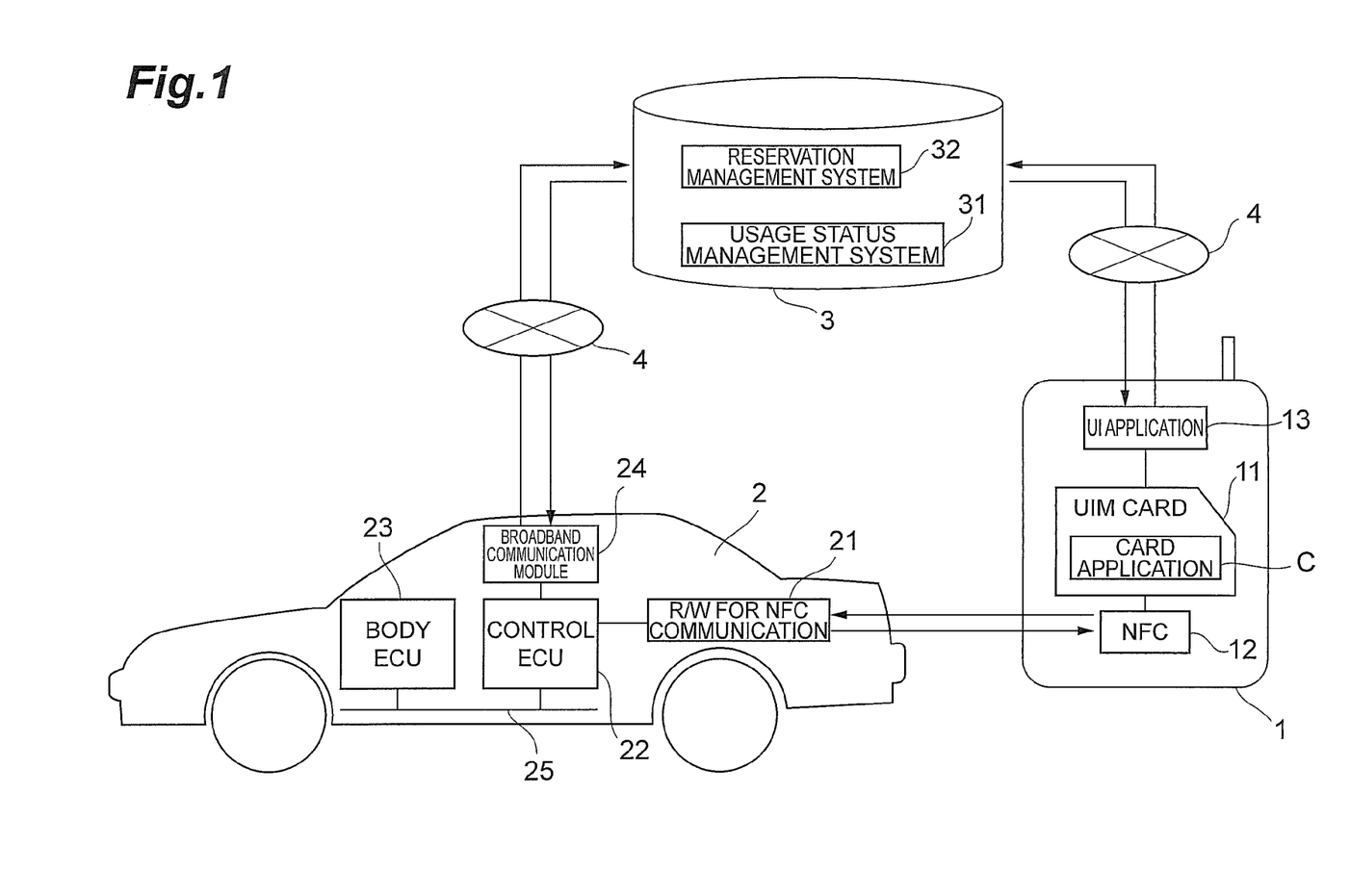
FIG. 1 is a block configuration diagram of a system for using a communication terminal according to a first embodiment of the invention.

FIG. 1 is a block configuration diagram of a system for using a communication terminal according to a first embodiment of the invention. As shown in FIG. 1, a system for using a communication terminal according to the embodiments is configured by being provided with a portable telephone 1 which is a portable terminal, a vehicle-mounted system mounted in a shared vehicle 2 which is a target, and a key management server 3. The portable telephone 1 is provided with a UIM (User Identity Module) card holder 11, a short range wireless communication device (Near Field Communication, hereinafter referred to as "NFC") 12 and a UI application 13.

In the embodiments, the shared vehicle 2 is a shared vehicle when performing so-called car sharing, and a user of the portable telephone 1 is able make a reservation or the like for the shared vehicle 2 from the portable telephone 1. In addition, the user is able to perform information processing when starting use or stopping use of the shared vehicle 2 by using the portable telephone 1.

In addition, the vehicle-mounted system installed in the shared vehicle 2 is provided with a reader-writer (hereinafter, referred to as R/W) for NFC communication 21 which is reading means, a control ECU (Electronic Control Unit) 22 which is instructed content determination means, a body ECU 23 which is operation instruction means and a broadband communication module 24. Furthermore, a usage status management system 31 and a reservation management system 32 are constructed in the key management server 3. The key management server 3 is provided in a base station or the like of an information processing center (not shown) or the like.

The portable telephone 1 has a so-called contactless proximity communication function built therein. In the portable telephone 1, a card application C is insertable into the UIM card holder 11. Individual information such as the name, age, telephone number and the like of the portable telephone user is recorded in the card application C, and the individual information recorded in the card application C may be read out in the UIM card holder 11. The UIM card holder 11 into which the card application C is inserted configures the identification information storage means of the present invention.

When performing a reservation of the shared vehicle 2, a portable telephone user inputs information relating to the desired usage schedule or the like of the reservation for the shared vehicle 2 into the portable telephone 1. In the portable telephone 1, the input reservation information is input to the UI application 13 along with the individual information. The UI application 13 transmits the input reservation information to the key management server 3 along with the individual information.

In the key management server 3, the reservation information and individual information transmitted from the portable telephone 1 are referenced by the usage status management system 31. The usage status of the shared vehicle 2 is stored in the usage status management system 31. In the usage status management system 31, the transmitted reservation information and the stored usage status for the shared vehicle 2 are compared and whether or not a reservation of the shared vehicle 2 is possible is determined. Furthermore, in the usage status management system 31, a billing process is performed with respect to the portable telephone user when the shared vehicle 2 is used.

In the reservation management system 32, reservation availability information is transmitted to the portable telephone 1 according to the availability of a reservation for the shared vehicle 2. At this time, if a reservation for the shared vehicle 2 is possible, the reservation management system 32 issues and transmits a usage key to the portable telephone 1 and a broadband communication module 24 in the vehicle-mounted system of the shared vehicle 2 while performing management of the reservation data by registering or the like the individual information. In the portable telephone 1, the transmitted usage key is input to the UIM card holder 11 along with managing of the transmitted reservation availability information by the UI application 13.

In addition, the UIM card holder 11 in the portable telephone 1 retains a cryptographic key. The UIM card holder 11 applies the cryptographic key to the usage key transmitted from the key management server 3 and input to the UI application 13 and transmits it to the NFC 12.

Figure 2:
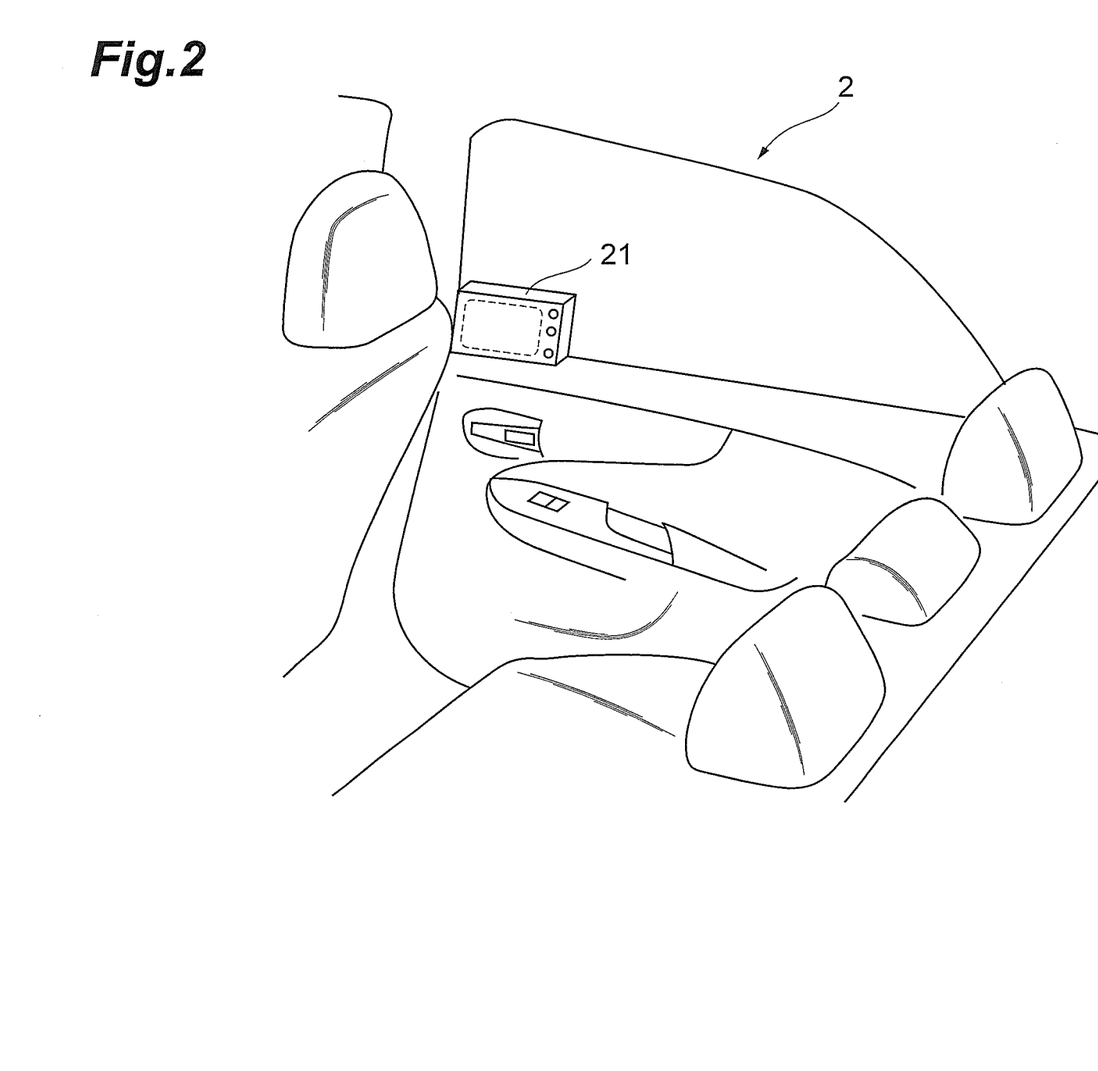
FIG. 2 is a perspective drawing seen from the inside of a vehicle to which a vehicle-mounted device is installed.

The NFC 12 transmits the cryptographic key transmitted from the UIM card holder 11 to the R/W for NFC communication 21 in the vehicle-mounted system in the shared vehicle 2. As shown in FIG. 2, for example, the R/W for NFC communication 21 is installed at a window portion of a rear seat in the shared vehicle 2. In addition, the R/W for NFC communication 21 receives the transmitted cryptographic key from the NFC 12 in the portable phone 1.

Figure 3:
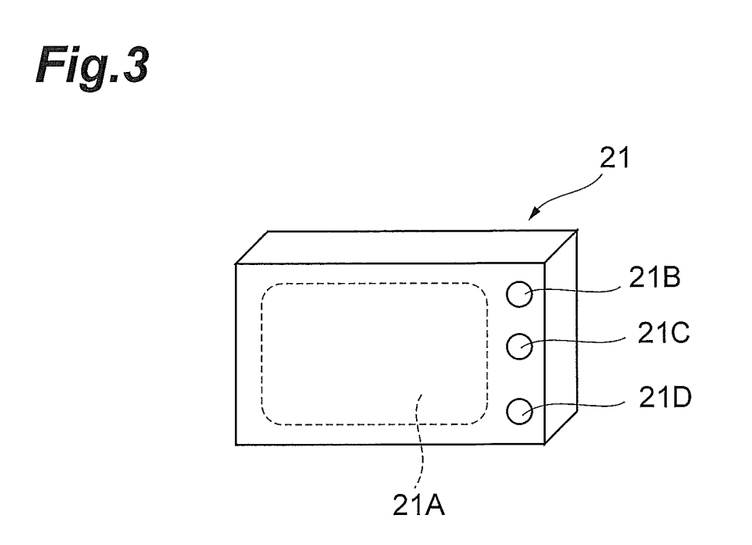
FIG. 3 is a perspective drawing of a vehicle-mounted device.

As shown in FIG. 3, the R/W for NFC communication 21 is provided with a communication antenna 21A, a first indicator 21B, a second indicator 21C, and a third indicator 21D. The communication antenna 21A is a member that performs transmitting and receiving using contactless proximity communication with the portable telephone 1.

Figure 4:
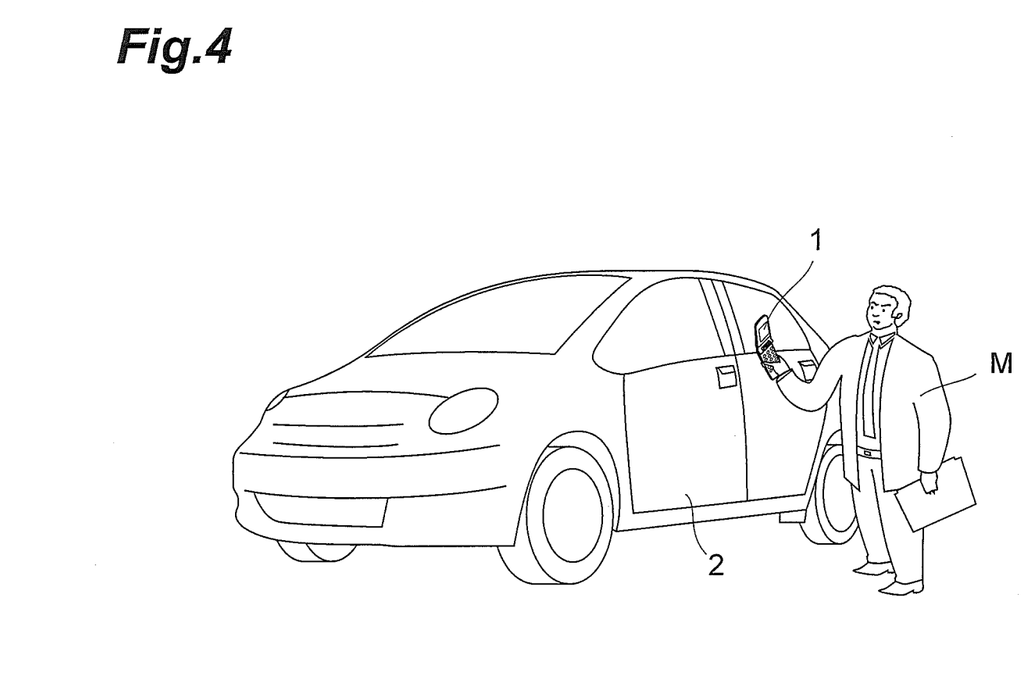
FIG. 4 is a perspective drawing showing an example of a user holding up a portable terminal.

When performing contactless proximity communication with the portable telephone 1 via the communication antenna 21A, for example, as shown in FIG. 4, the portable telephone user M holds the portable telephone 1 up to the R/W for NFC communication 21 in the shared vehicle 2.

By holding the mobile telephone 1 up to the R/W for NFC communication 21, the cryptographic key is transmitted from the NFC 12 in the portable telephone 1 to the R/W for NFC communication 21 in the vehicle-mounted system of the shared vehicle 2. Furthermore, a holding time which is the time the portable telephone 1 is held up is measured in the R/W for NFC communication 21. The R/W for NFC communication 21 transmits the cryptographic key transmitted from the portable telephone 1 and the holding time of the portable telephone 1 to the control ECU 22.

The indicators 21B to 21D in the R/W for NFC communication 21 shown in FIG. 3 are each able to turn on, turn off and blink. Furthermore, in the R/W for NFC communication 21, the cryptographic key is removed, and the individual information of the portable telephone user M and the usage key of the shared vehicle 2 are confirmed.

In addition, the broadband communication module 24 shown in FIG. 1 performs transmission and reception of information to the key management server 3 via the Internet 4. In addition, the broadband communication module 24 transmits the usage key transmitted from the key management server 3 to the control ECU 22.

The control ECU 22 compares the usage key of the shared vehicle 2 transmitted from the R/W for NFC communication 21 with the usage key transmitted from the broadband communication module 24, and authenticates the portable telephone user M who made the reservation. Furthermore, the control ECU 22 references the holding time transmitted from the R/W for NFC communication 21 and performs processing relating to transmission of a lock signal and a lock release signal or a usage stopping process for the shared vehicle 2 according to the holding time.

Furthermore, in a case where the usage key transmitted from the R/W for NFC communication 21 is authenticated, the control ECU 22 transmits a lock release signal to the body ECU 23 in a case where the door or the like of the shared vehicle 2 is in a locked state. On the other hand, if the door or the like of the shared vehicle 2 is in an unlocked state, a lock signal is transmitted to the body ECU 23.

The body ECU 23 performs a lock release operation releasing a locked lock on a locked door of the shared vehicle 2 in response to a lock release signal transmitted from the control ECU 22. On the other hand, a locking operation locking the door of the shared vehicle 2 is performed in response to a lock signal transmitted from the control ECU 22. The control ECU 22 and the body ECU 23 are connected via a vehicle-mounted LAN (Local Area Network) 25.

Next, operation of the system for using a communication terminal according to the present embodiment will be described. In the system for using communication terminal according to the present embodiment, the portable telephone user M makes a reservation for the shared vehicle 2 on the key management server 3 when the portable telephone user M wishes to use the shared vehicle 2 used by a plurality of users for car sharing. When the reservation is completed, the key management server 3 transmits the usage key to the portable telephone 1 and the vehicle-mounted system in the shared vehicle 2.

When the reservation of the shared vehicle 2 is completed and is a reserved schedule, the portable telephone user M becomes able to use the shared vehicle 2 during the reservation period. While the portable telephone user M is using the shared vehicle 2, the portable telephone user M is able to perform door lock and door lock release operations for the shared vehicle 2 through holding the portable telephone 1 up to the R/W for NFC communication 21. Specifically, by holding portable telephone 1 up for a first communication time, for example 0.2 seconds, with respect to the R/W for NFC communication 21, door lock control is started. In addition, by holding up for a second communication time longer than the first communication time, a usage stopping process is started. In so doing, the first communication time and the second communication time become the reading conditions.

Figure 5:
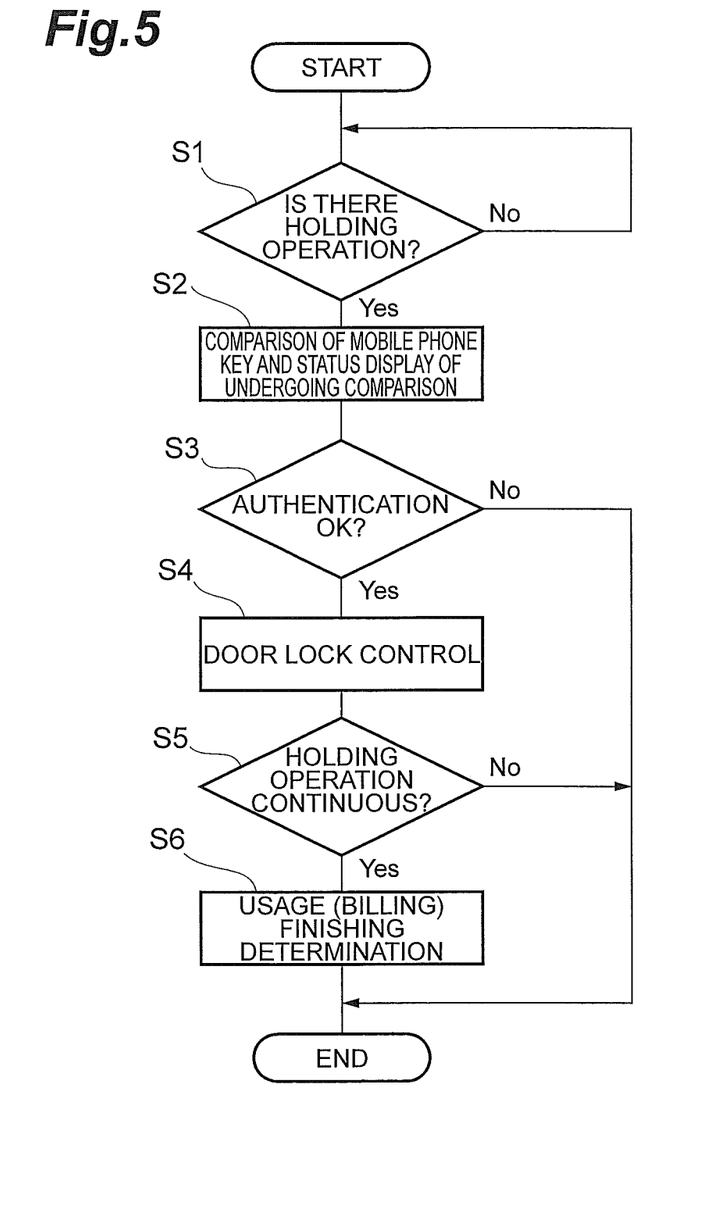
FIG. 5 is a flowchart showing a processing procedure in a vehicle-mounted system.

Processing in the vehicle-mounted system while the portable telephone user M is using the shared vehicle 2 will be described. Herein, a case where the portable telephone user exits the shared vehicle 2 and whether to perform door locking or finish usage of the shared vehicle 2 after door locking is performed will be described. FIG. 5 is a flowchart showing a processing procedure in a vehicle-mounted system.

In a case where the portable telephone user M exits the shared vehicle 2 during use of the shared vehicle 2, the door enters a state in which the lock is released. Thereafter, as shown in FIG. 5, in the vehicle-mounted system, it is determined whether or not there has been a holding operation in which the portable telephone 1 is held up (S1). This determination is performed according to whether or not the R/W for NFC communication 21 receives the transmitted cryptographic key from the portable telephone 1 and the holding operation continues for 0.2 seconds which is the first communication time. As a result, in a case where it is determined that the cryptographic key is not received and there is no holding operation, Step S1 repeats until it is determined there is a holding operation.

Meanwhile, in a case it is determined that the R/W for NFC communication 21 receives the cryptographic key and there is a holding operation, the control ECU 22 performs a comparison on the cryptographic key (S2). Upon performing the comparison on the cryptographic key, when the portable telephone user M starts use of the shared vehicle 2, the control ECU 22 of the vehicle-mounted system stores the usage key transmitted from the key management server 3. Here, the control ECU 22 compares the usage key to which the cryptographic key transmitted from the portable telephone 1 is applied and the cryptographic key transmitted from the key management server 3, performs authentication of whether or not the portable telephone user M is a person using the shared vehicle 2.

While performing comparison of the cryptographic keys, the first indicator 21B is blinked as shown in FIG. 3 and the control ECU 22 performs a status display of undergoing comparison through blinking the first indicator 21B (S2). The status display of undergoing comparison is a display showing that comparison of the cryptographic keys is being performed. By performing the status display of undergoing comparison, that the comparison of the current cryptographic keys is being performed is reported to the portable telephone user M. Blinking of the first indicator 21B continues until the door locking control finishes.

The control ECU 22 performs comparison of the cryptographic keys and determines whether or not the authentication is OK (S3). Specifically, authentication is determined to be OK in a case where the portable telephone user is a user of the shared vehicle 2. As a result, in a case where authentication is not OK, since the portable telephone user is not a user of the shared vehicle 2, they have no right to use the shared vehicle 2. Accordingly, the process finishes as it is.

Figure 6:
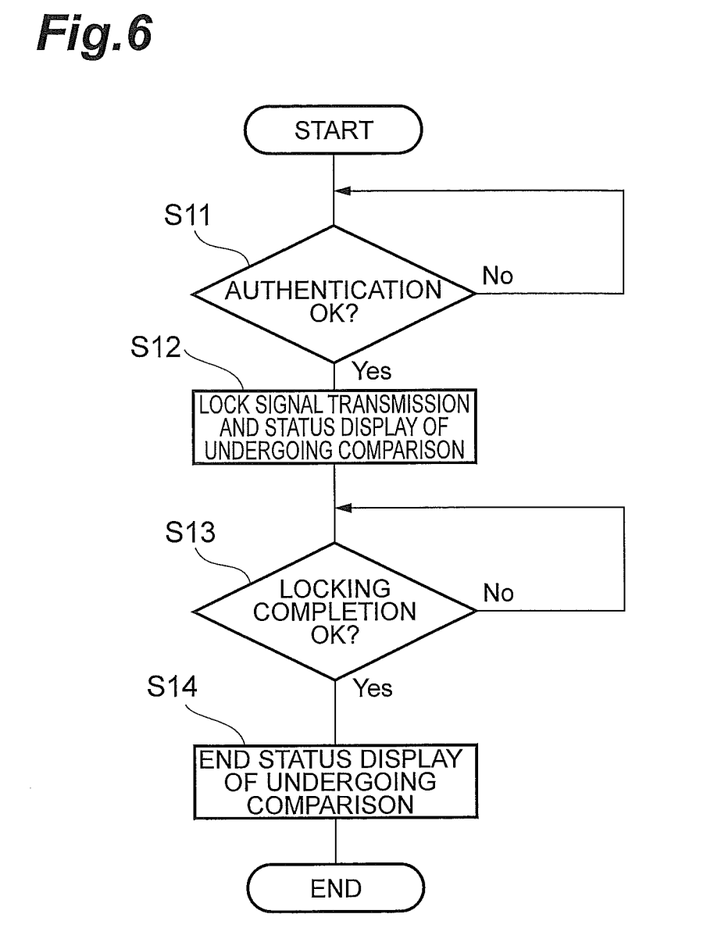
FIG. 6 is a flowchart showing a processing procedure of door locking.

On the other hand, in a case where it is determined that authentication is OK, the portable telephone user M is a user of the shared vehicle. In this case, the portable telephone user M is a person with the right to use the shared vehicle 2, and a door locking control is performed (S4). The door locking control is performed following the procedure shown in FIG. 6. FIG. 6 is a flowchart showing a processing procedure of a door locking control.

As shown in FIG. 6, when the door locking control is performed, the control ECU 22 determines whether or not authentication is OK (S11). As a result, in a case where authentication is not OK, the process of Step S11 repeats until authentication becomes OK. Meanwhile, in a case where it is determined that authentication is OK, the control ECU 22 transmits a lock signal to the body ECU 23 (S12). The body ECU 23 performs door locking of the shared vehicle 2 based on the transmitted lock signal.

Subsequently, the body ECU 23 determines whether or not the locking task is completed (S13). As a result, in a case where the locking task is not completed, the process of Step S13 repeats until the lock task completes. On the other hand, in a case where it is determined that the lock task is completed, the control ECU 22 causes the first indicator 21B to turn off as shown in FIG. 3 and the status display of undergoing comparison is stopped (S14). In so doing, by stopping the status display of undergoing comparison, the completing of the comparison of the cryptographic keys and the locking task is reported to the portable telephone user M. In this way, the door locking control finishes.

Returning to the flow shown in FIG. 5, when the door locking control finishes, the R/W for NFC communication 21 determined whether or not the holding operation is continuing (S5). Here, after the door locking control is finished, it is determined whether or not the holding operation is continued for one or more seconds which is the second communication time. Here, the second communication time is the measured time from starting of the holding operation, the second communication time is set to a time longer than the first communication time. As a result, in a case where it is determined that the holding operation is not continued, the portable telephone user M is considered to intend using the shared vehicle 2 as it is, without intending to finish use. In this case, the process finishes as it is.

Figure 7:
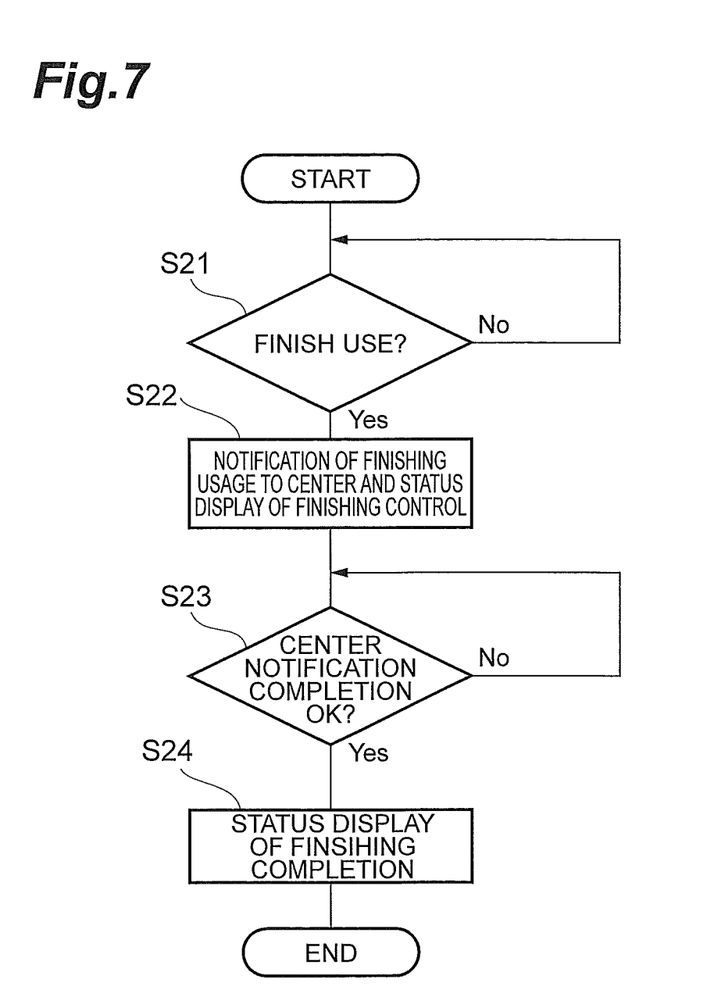
FIG. 7 is a flowchart showing a processing procedure of a usage finishing determination.

On the other hand, in a case where it is determined that the holding operation is continued, the usage finishing process is performed. In the usage finishing process herein, a billing process is also performed. The usage finishing process is performed following the flowchart shown in FIG. 7. FIG. 7 is a flowchart showing a procedure of the usage finishing process. As shown in FIG. 7, first, the control ECU 22 determines whether or not the use of the shared vehicle 2 is finished by the portable telephone user (S21). Specifically, the holding time transmitted from the R/W for NFC communication 21 is referenced and it is determined whether or not the holding operation of the portable telephone 1 continues for the second communication time or longer.

As a result, in a case where it is determined that the use of the shared vehicle 2 is finished by the portable telephone user M, the control ECU 22 notifies the key management server 3 by transmitting a usage finishing signal via the broadband communication module 24 (S22). Along with notification of the usage finishing signal, the second indicator 21C in the R/W for NFC communication 21 is blinked, and a status display of finishing control is performed through blinking of the second indicator 21C (S22). The status display of finishing control is a display showing that a finish control process for the shared vehicle 2 is being performed. Through performing the status display of finishing control, that the finish control process for the shared vehicle 2 is being performed is reported to the portable telephone user.

Thereafter, the usage finishing signal is transmitted from the broadband communication module 24 to the key management server 3 in the information processing center and it is determined whether or not notification is completed (S23). As a result, in a case where notification is not completed, the process returns to Step S23, and notification continues until notification is completed.

On the other hand, in a case where notification is completed, the third indicator 21D shown in FIG. 3 is turned on, a status display of finishing complete is performed (S24). The status display of finishing complete is a display showing that a finish completion process for the shared vehicle 2 is being performed. Through performing the status display of finishing complete, that the finish completion process for the shared vehicle 2 is being performed is reported to the portable telephone user M. The blinking of the third indicator 21D continues until a predetermined time from completing notification of the usage finishing signal with respect to the key management server 3 elapses. In this way, the usage finishing process finishes.

Figure 8:
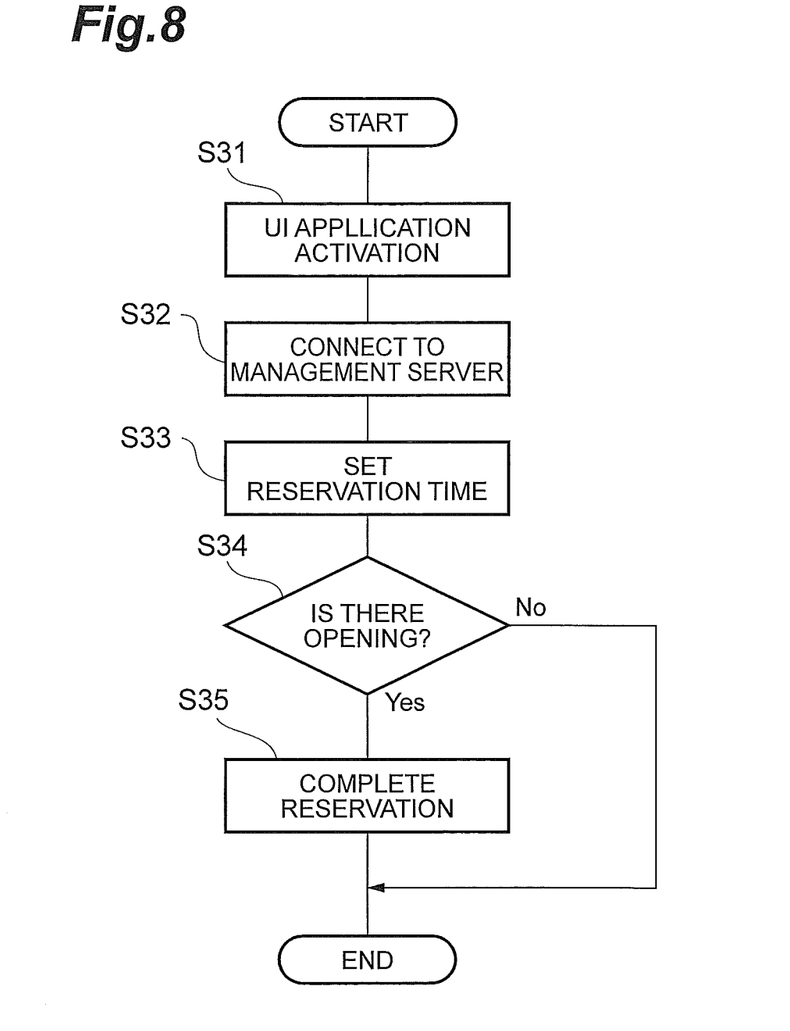
FIG. 8 is a flowchart showing a procedure of a reservation management process.
Figure 9:
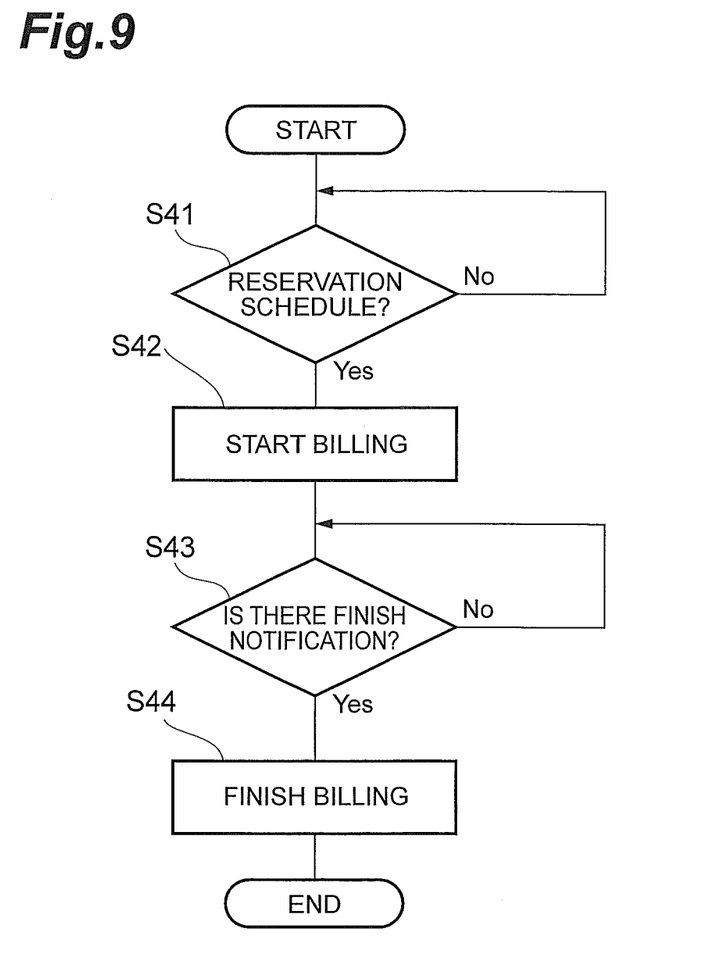
FIG. 9 is a flowchart showing a procedure of a billing process.

In addition, the reservation management process and the billing process are performed using the following procedure. FIG. 8 is a flowchart showing the procedure of the reservation management process and FIG. 9 is a flowchart showing the procedure of the billing process. As shown in FIG. 8, when performing the reservation management process, the UI application 13 in the portable telephone 1 is activated by the portable telephone user M (S31).

Next, a connection process connecting to the key management server 3 is performed (S32). The connection process to the key management server 3 is performed according to the portable telephone user M operating an appropriate operation button provided on the portable telephone 1. Once connected to the key management server 3, setting of the reservation time is performed (S33). Setting of the reservation time is performed according to portable telephone user M operating an operation button of a numerical keypad or the like in the portable telephone 1.

After performing setting of the reservation time by the portable telephone 1, the usage status management system 31 references the reservation management system 32 and determines whether or not there is an opening as the set reservation time (S34). As a result, since the reservation cannot be made if there is no opening at the reservation time, the reservation management process finishes as it is. On the other hand, if there is an opening at the reservation time, the reservation management system 32 performs the reservation setting with respect to the set reservation time (S35), and the reservation management process finishes.

In addition, as shown in FIG. 9, upon performing the billing process, the usage status management system 31 in the key management server 3 determines whether or not there is a reservation schedule set using the reservation management process (S41). As a result, in a case where it is determined there is not reservation schedule, and the process according to Step S41 repeats until there is a reservation schedule.

On the other hand, in a case where it is determined there is a reservation schedule, the usage status management system 31 starts billing (S42). Subsequently, it is determined whether or not there is a finish notification according to the usage finishing signal being transmitted from the broadband communication module 24 in the vehicle-mounted system (S43). As a result, in a case where there is not finish notification, the process in Step S24 repeats until there is a finish notification. In addition, in a case where there is a finish notification, the usage status management system 31 finishes billing (S44) and the billing process finishes.

In so doing, in the system for using a communication terminal according to the present embodiment, the processes performed by the vehicle-mounted system differ according to the time the portable telephone 1 is held up to the R/W for NFC communication 21 in the vehicle-mounted system. Specifically, in a case where the time held up to the R/W for NFC communication 21 is the first communication time, the door locking process is performed and the door locking operation is performed. In addition, in a case where the time held up to the R/W for NFC communication 21 is the second communication time, the process finishing use of the shared vehicle 2 for car sharing is performed and the usage finishing operation is performed for the shared vehicle 2.

Since the processes performed by the vehicle-mounted system differ according to the time the portable telephone 1 is held up, it is possible for a plurality of operations to be performed according to a single item of identification information stored in the portable telephone 1. In addition, upon performing differing operations, since the portable telephone user M may change only the time the portable telephone 1 is held up, the time and effort imposed on the portable telephone user M is able to be reduced.

In addition, the first communication time is set as a time shorter than the second communication time. Thereby, it is possible to easily determine differing instruction content. Furthermore, until instruction is performed of the door locking operation corresponding to the first communication time, it is not possible to instruct the operation corresponding to the second communication time. Thereby, before the door locking operation completes, the usage finishing operation for the shared vehicle 2 cannot be performed. Accordingly, improper operations in which the usage of the shared vehicle 2 finishes without locking the door can be prevented.

Furthermore, by the portable telephone user M holding the portable telephone 1 up for the first communication time, the door locking operation which is the basic operation is performed and by holding up for the second communication time, the usage finishing operation for the shared vehicle 2 which is the special operation is performed. Thereby, when the usage finishing operation of the shared vehicle 2 is performed, misoperations can be minimized. In addition, through the R/W for NFC communication 21 being provided in the shared vehicle 2, the vehicle can be satisfactorily used in car sharing.

Figure 10:
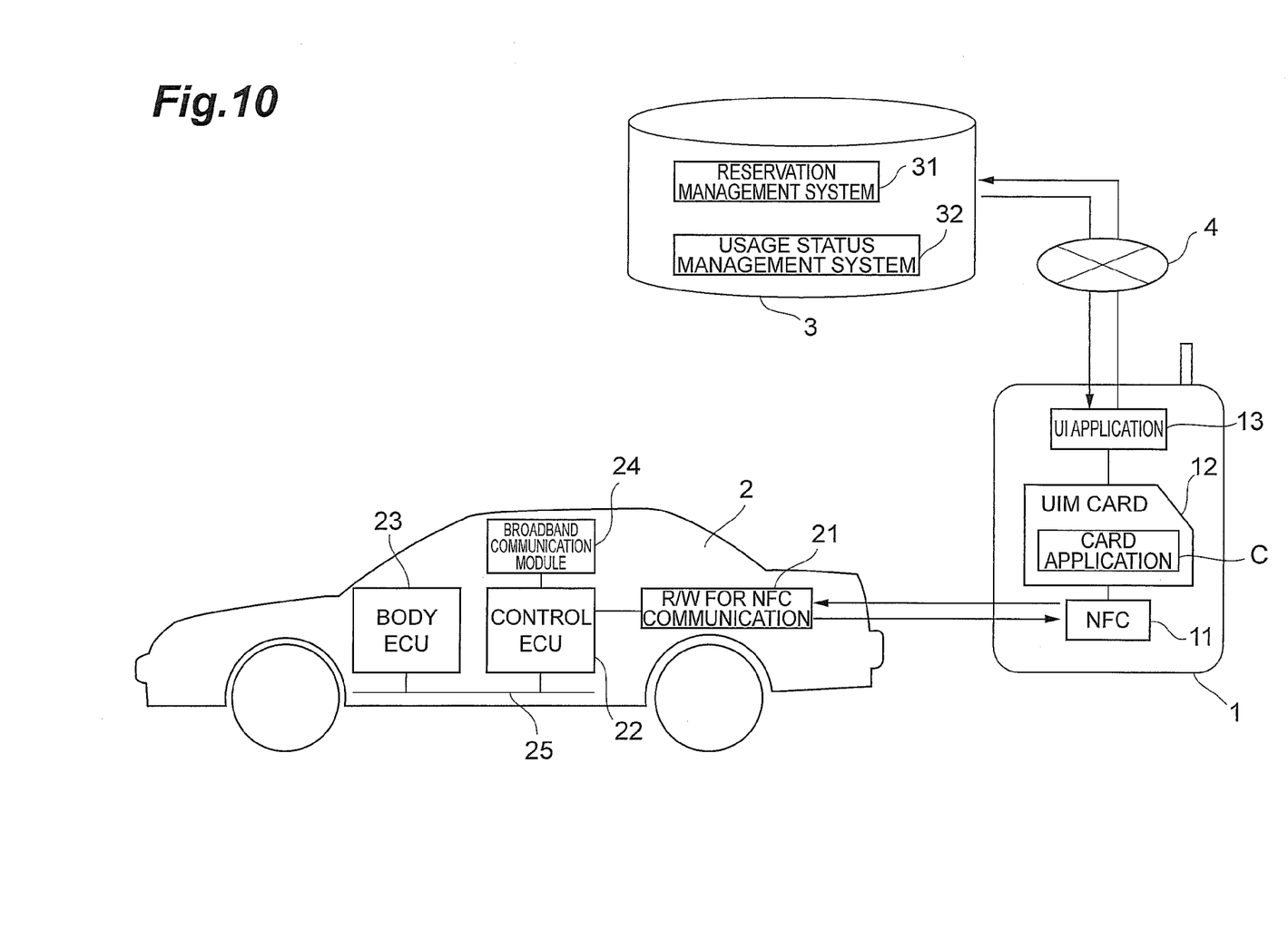
FIG. 10 is a block configuration diagram of a system for using a communication terminal according to a second embodiment.

Next, a second embodiment of the invention will be described. The present embodiment differs when compared to the first embodiment on the point of communication between the shared vehicle 2 and the key management server 3 via the Internet 4 being unavailable. As shown in FIG. 10, the system for using a communication terminal according to the present invention, similarly to the first embodiment, is provided with a portable telephone 1, a shared vehicle 2 and a key management server 3. The configurations of the portable telephone 1, shared vehicle 2 and key management server 3 are the same as the first embodiment.

In the system for using a communication terminal according to the present embodiment, information transmitted to the key management server 3 by the broadband communication module 24 of the shared vehicle 2 in the first embodiment is transmitted to the NFC 12 in the portable telephone 1 from the R/W for NFC communication 21. In the portable telephone 1, information transmitted from the R/W for NFC communication 21 is received by the NFC 12 and transmitted to the key management server 3 via the Internet 4. Conversely, information transmitted to the broadband communication module 24 in the shared vehicle 2 from the key management server 3 in the first embodiment is transmitted via the portable telephone 1. In so doing, the mode may be one which transits the portable telephone 1 without performing information communication between the key management server 3 and the shared vehicle 2 directly via the Internet 4.

Above, preferred embodiments of the present invention have been described; however, the invention is not limited to the above embodiments. For example, in the above embodiments, the R/W for NFC communication 21, as shown in FIG. 3, is provided with indicators 21B to 21D in addition to the communication antenna 21A; however it is possible to provide a display on the surface or separately provide a speaker. By providing a display or a speaker, it is possible to perform provision of information to the portable telephone user M using text information or audio information.

In addition, in the above embodiments, the length of the communication time between the R/W for NFC communication 21 of the vehicle-mounted system in the shared vehicle 2 and the NFC 12 in the portable telephone 1 is set as the reading conditions; however it is possible to set other reading conditions. For example, in a state in which communication between the NFC 12 and the R/W for NFC communication 21 is maintained as it is, a short hold is done for a short time only when the portable telephone 1 is held up to the R/W for NFC communication 21, and after the short hold is done a long hold in which holding continues for a fixed time are possible.

Alternatively, under conditions where communication between the NFC 12 and the R/W for NFC communication 21 is maintained as it is, when holding up the portable telephone 1, swinging or rocking of the portable telephone 1 may be set as the reading conditions. It is possible to determine an operation rocking or swinging the portable telephone 1 using an acceleration sensor provided in the portable telephone 1, for example. Furthermore, when holding up the portable telephone 1, a rotating operation in which the portable telephone 1 is rotated, or in which the direction of the portable telephone 1 is changed, or the like may be set as the reading conditions. The rotating operation or the operation changing the direction may be determined using an acceleration sensor.

Furthermore, as the reading conditions, another relationship may be concurrently used, rather than only the relationship between the NFC 12 in the portable telephone 1 and the R/W for NFC communication 21 in the vehicle-mounted system in the shared vehicle 2. For example, it is possible to concurrently use an operation holding up the portable telephone 1 to the R/W for NFC communication 21 and speech recognition.

Specifically, the portable telephone 1 has a microphone function, and acquires speech of the portable telephone user M. Here, in a case where the portable telephone user M is silent, when a normal operation, for example a door locking or door lock release is performed, and the portable telephone user M holds up the portable telephone 1 while uttering "finish billing", it is possible to end billing (use of shared vehicle 2). Alternatively, in a case where the portable telephone 1 is able to acquire navigation information from a navigation device provided in the shared vehicle 2, when the portable telephone user M holds up the portable telephone 1 while uttering "navigation information", it is possible to acquire navigation information.

Alternatively, in addition to concurrent use of the operation holding up portable telephone 1 and speech, it is possible to concurrently use an operation holding up the portable telephone 1 and a predetermined button operation. For example, it is possible for the billing finish process to be performed when the portable telephone 1 is held up while depressing the "1" on the numerical key pad on the portable telephone 1, and navigation information acquisition process to be performed when the portable telephone 1 while depressing the "2" on the numerical keypad.

Furthermore, through having a plurality of ways of holding up the portable telephone 1, separate functions may be activated according to the respective ways of holding. For example, it is possible to activate speech recognition through performing a long hold of the portable telephone 1, and to activate a button operation standby function through holding up and swinging the portable telephone 1. In addition, it is possible for the portable telephone user M to arbitrarily set the plurality of ways of holding and execution functions.

In the above embodiments, as the plurality of operations, examples of a usage finishing process when a shared vehicle 2 is used for car sharing and a process of door locking of the shared vehicle 2 have been described; however other processes are possible. As the other processes, activating and finishing short range wireless communication in between a vehicle and a portable telephone and the like are also possible.

Alternatively, transmitting and receiving vehicle information or transmitting and receiving individual information in between a vehicle and a portable telephone are also possible. Examples of the vehicle information herein include the locking state, the parking position of the vehicle when parked, the remainder and amount used of fuel and the like. In addition, examples of the individual information include individual ID, music or image data, destination or residence information and the like.

Furthermore, in the above embodiments, and example in which an operation device is provided in the shared vehicle has been described; however, the operation device may be provided somewhere other than the shared vehicle. For example, along with being in a residence or consumer appliance, locking and lock releasing or notification of the state of the residence, consumer appliance operations or the like may be set as the target. In this case, it is possible, for example, for the basic operation to be a locking or lock release operation for the residence and the special operation to be turning the power inside the residence on and off. In addition, with regard to vehicles, along with ordinary vehicles other than shared vehicles and in addition in rental cars and the like being possible, use is possible in buses and in taxis or the like.

INDUSTRIAL APPLICABILITY

The present invention may be used in a system for using a communication terminal in which it is possible to reduce the time and effort imposed on a user along with being able to perform a plurality of operations according to a single item of identification information.

REFERENCE SIGNS LIST

1 . . . portable telephone
2 . . . shared vehicle
3 . . . key management server
4 . . . Internet
11 . . . UIM card holder
12 . . . NFC 13 . . . U1 application
21 . . . R/W for NFC communication
21A . . . communication antenna
21B to 21D . . . indicator
22 . . . control ECU
23 . . . body ECU
24 . . . broadband communication module
25 . . . vehicle-mounted LAN
31 . . . usage status management system
32 . . . reservation management system
C . . . card application
M . . . portable telephone user

The invention claimed is:

1. A system comprising:
a communication terminal that initiates, in a server, a reservation of a vehicle and a billing process, wherein the communication terminal includes:
a memory for storing user identification information, and
a contactless proximity communicator; and
an operation device that is mounted to the vehicle and performs a predetermined operation according to the user identification information, wherein the operation device includes:
a reader for reading the user identification information by a communication between the contactless proximity communicator and the reader;
a first controller that identifies whether a user of the communication terminal is a user of the vehicle based on the user identification information and measures a duration of the communication between the contactless proximity communicator and the reader; and
a second controller that performs a door locking operation on the vehicle if the first controller has identified the user of the communication terminal as the user of the vehicle and has measured the duration of the communication to be a first duration,
wherein, after the second controller has performed the door locking operation on the vehicle, if the first controller identifies the duration of the communication to be equal to or greater than a second duration, the second duration being longer than the first duration, the first controller performs a usage finishing process on the vehicle, the usage finishing process including completing the billing process in the server.

* * * * *